(12) United States Patent
Roberts

(10) Patent No.: US 7,878,703 B2
(45) Date of Patent: Feb. 1, 2011

(54) ELECTRONICALLY CONTROLLED DIRECT INJECTION FOAM DELIVERY SYSTEM WITH TEMPERATURE COMPENSATION

(75) Inventor: Geary E. Roberts, Glendale, AZ (US)

(73) Assignee: Waterous Company, South St. Paul, MN (US)

( * ) Notice: Subject to any disclaimer, the term of this patent is extended or adjusted under 35 U.S.C. 154(b) by 785 days.

(21) Appl. No.: 11/769,134

(22) Filed: Jun. 27, 2007

(65) Prior Publication Data

US 2007/0246230 A1 Oct. 25, 2007

Related U.S. Application Data

(63) Continuation-in-part of application No. 11/678,376, filed on Feb. 23, 2007, which is a continuation-in-part of application No. 11/087,340, filed on Mar. 22, 2005, now abandoned.

(60) Provisional application No. 60/558,347, filed on Mar. 31, 2004.

(51) Int. Cl.
*G05D 11/08* (2006.01)
*G05D 11/16* (2006.01)
*B01F 15/04* (2006.01)

(52) U.S. Cl. .............. 366/151.1; 366/152.2; 366/152.4; 366/182.1

(58) Field of Classification Search .............. 366/152.2, 366/152.4, 151.1, 182.1; 137/5; 324/446; 700/299, 282, 239
See application file for complete search history.

(56) References Cited

U.S. PATENT DOCUMENTS

| 4,717,582 A | * | 1/1988 | Kotoye et al. ................... 427/8 |
| 5,174,383 A | * | 12/1992 | Haugen et al. ................. 169/15 |
| 5,232,052 A | | 8/1993 | Arvidson et al. |
| 5,284,174 A | | 2/1994 | Norman |

(Continued)

FOREIGN PATENT DOCUMENTS

| JP | 06-170204 | 6/1994 |
| JP | 07-051396 | 2/1995 |

OTHER PUBLICATIONS

Eclipse ES™, Waterous CAFSystems, 2 pages, 2002.
FoamLogix V-Series CAFSPro MiniCAFSPro, High Performance Foam Proportioning and Compressed Air Foam Systems, Hale Products, Inc., 8 pages.
FoamManager™, Waterous Company, 2 pages, 1997.

(Continued)

*Primary Examiner*—Tony G Soohoo
(74) *Attorney, Agent, or Firm*—Robert D. Atkins; Patent Law Group

(57) ABSTRACT

Fire fighting equipment uses an electronically controlled direct injection foam delivery system. A water pump pumps water through a pipe. A foam pump pumps foam into a mixing chamber within the pipe to produce a water-foam mixture. A microprocessor-based control unit controls the water pump and foam pump. A conductivity sensor is coupled in-line with the pipe for monitoring conductivity of the mixture and providing a feedback signal to the control unit to regulate the foam pump. A speed sensor monitors the foam usage. A second conductivity sensor monitors conductivity of the water and provides a feedback signal to the control unit. The foam delivery system can be controlled by monitoring the flow rate of the water and regulating the foam pump to maintain a constant water and foam mixture. A temperature sensor compensates the regulation process for changes in water and foam mixture temperature.

25 Claims, 9 Drawing Sheets

U.S. PATENT DOCUMENTS

| | | | |
|---|---|---|---|
| 5,291,951 A | | 3/1994 | Morand |
| 5,727,933 A | | 3/1998 | Laskaris et al. |
| 5,823,219 A | | 10/1998 | Purvis et al. |
| 6,155,351 A | * | 12/2000 | Breedlove et al. ............. 169/14 |
| 6,725,940 B1 | | 4/2004 | Klein et al. |
| 2005/0222287 A1 | | 10/2005 | Roberts |
| 2007/0246230 A1 | * | 10/2007 | Roberts ....................... 169/13 |
| 2008/0035201 A1 | * | 2/2008 | Roberts ......................... 137/5 |

OTHER PUBLICATIONS

FoamPro®, Hypro Corporation, 16 pages, 2001.
National Fire Protection Association, NFPA 1901 Standard for Automotive Fire Apparatus, 2003 Edition, 8 pages.
Waterous CAFSystems™, 10 pages, 2000.

* cited by examiner

ELECTRONICALLY CONTROLLED DIRECT INJECTION FOAM DELIVERY SYSTEM WITH TEMPERATURE COMPENSATION

CLAIM TO DOMESTIC PRIORITY

The present application is a continuation-in-part of patent application Ser. No. 11/678,376, filed on Feb. 23, 2007, which is a continuation-in-part of application Ser. No. 11/087,340, filed on Mar. 22, 2005, now abandoned and which claims the benefit of priority of provisional Application Ser. No. 60/558,347, filed on Mar. 31, 2004.

FIELD OF THE INVENTION

The present invention relates in general to fluid mixing and delivery systems and, more particularly, to a temperature compensated system and method of mixing foam concentrate into a water stream during fire fighting activities.

BACKGROUND OF THE INVENTION

Fire fighting equipment and processes are an essential part of public safety and protection of property. Fire fighting departments are organized under city, county, and private companies and brigades. The fire fighting departments use a variety of equipment, and provide training to fire fighters in proper use of such equipment in fighting fires, fire prevention, and public safety.

Fire fighting equipment is often classified by the type of flammable material which it is most effective against. Class A fires and related equipment involve solid combustibles, building materials, structures, rubbish, vehicles, industrial, marine, wildlands, and the like. Class B fires relate to flammable liquids, Class C fires are electrical fires, and Class D fires involve combustible metals. Water alone is often not the most efficient and effective fire-extinguishing agent. Water addresses only the heat portion of the heat-fuel-oxygen fire interaction. In many situations, Class A foam mixed with water is more effective in extinguishing the flames. Class A foam contains a surface active agent, which reduces the surface tension of the water, allowing it to penetrate into the fuel surface. The foam bubbles cling to the fuel surface, isolating the fuel from the heat and oxygen. The water droplets in Class A foam are smaller than in a conventional water fog spray pattern, which provides for a more rapid conversion to stream when applied to a fire, resulting in better heat absorption.

The water and foam combination must have the proper mixture or percent concentration of foam in the water stream. The water has a flow rate as determined by the pressure and diameter of pipe. The water further has a certain conductivity based on the mineral, foreign matter, or particulate content, also known as hardness, of the water from its source. The foam is pumped from a tank or reservoir and injected into the water stream. The flow rate of the foam must proportionately match the flow rate of the water stream and take into account the conductivity of the water source in order to produce an effective foam concentration in the water stream as projected onto the fire.

Conventional electronic direct injection foam proportioning equipment is based on a volumetric approach using the water flow rate as measured by a turbine-flow meter for the foam delivery system. The foam concentrate flow rate is adjusted either manually or automatically to the desired percentage of the water flow. The foam is introduced into the water stream according to the water flow rate.

However, there exist a number of variables in the various electronic direct injection foam delivery systems that can lead to an inaccurate ratio of foam concentration in the water stream as projected onto the fire. Volumetric flow-based electronic foam proportioners do not automatically adjust for varying water hardness, which affects the quality of the finished foam mixture. The volumetric foam proportioners also do not automatically or accurately adjust for the variation in the detergent strength of the commercially available foam concentrates, which also affects the quality of the finished foam. Some utilize a motor-mounted velocity feedback sensor, which may not accurately represent the actual foam concentrate flow. The velocity of the water flow rate and the foam concentration in the water stream are in fact independent variables, which relate only when the system is working perfectly. The foam pump could even run dry or pump the wrong liquid and the proportioner will continue to function as though it were operating correctly.

In some situations, e.g., when responding to a large fire, there may not be a fire hydrant in proximity to the blaze or, due to inadequate water pressure, it may be necessary to tap into supplemental water sources to provide the necessary flow to extinguish the fire. Water may be supplied from an alternate source such as a water tanker or drafted from a nearby body of water. The water stored in the truck's tanks or siphoned from the body of water may not have the same conductivity characteristics as the water available from the hydrant water system. Moreover, the conductivity of water is known to vary from location to location. Variation in water conductivity will likely lead to incorrect foam concentration or foam effectiveness in the water stream as projected onto the fire.

SUMMARY OF THE INVENTION

In one embodiment, the present invention is a unit of fire fighting equipment having a direct injection foam delivery system comprising a control unit, a water pump for pumping water through a first pipe, and a foam pump for pumping foam through a second pipe. A mixing chamber has a first input coupled for receiving the water and a second input coupled for receiving the foam and an output for producing a water and foam mixture. A flow meter monitors flow rate of the water and provides a first electrical signal to the control unit which in turn controls the foam pump in response to the first electrical signal. A temperature sensor monitors the water and provides a second electrical signal to the control unit to compensate the control on the foam pump for changes in water temperature.

In another embodiment, the present invention is a direct injection foam delivery system comprising a water pump for pumping water through a first pipe and a foam pump for pumping foam through a second pipe. A mixing chamber has a first input coupled for receiving the water and a second input coupled for receiving the foam and an output for producing a water and foam mixture. A regulating means controls the water and foam mixture. A temperature sensor monitors and provides an electrical signal to the regulating means to compensate for changes in water temperature.

In another embodiment, the present invention is a system for mixing first and second fluids comprising a conduit for transporting the first fluid under pressure. The second fluid is injected into the conduit for producing a mixture of first and second fluids. A regulator controls a flow rate of the second fluid. A temperature sensor monitors the water and provides an electrical signal to the regulator to compensate the control of the flow rate of the second fluid for changes in water temperature.

In another embodiment, the present invention is a method of injecting foam into water flow comprising the steps of pumping water through a first pipe, pumping foam through a second pipe, mixing the water and foam to produce a water and foam mixture, sensing temperature of the water, and regulating the water and foam mixture. The regulation involves compensation for changes in water temperature.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1:
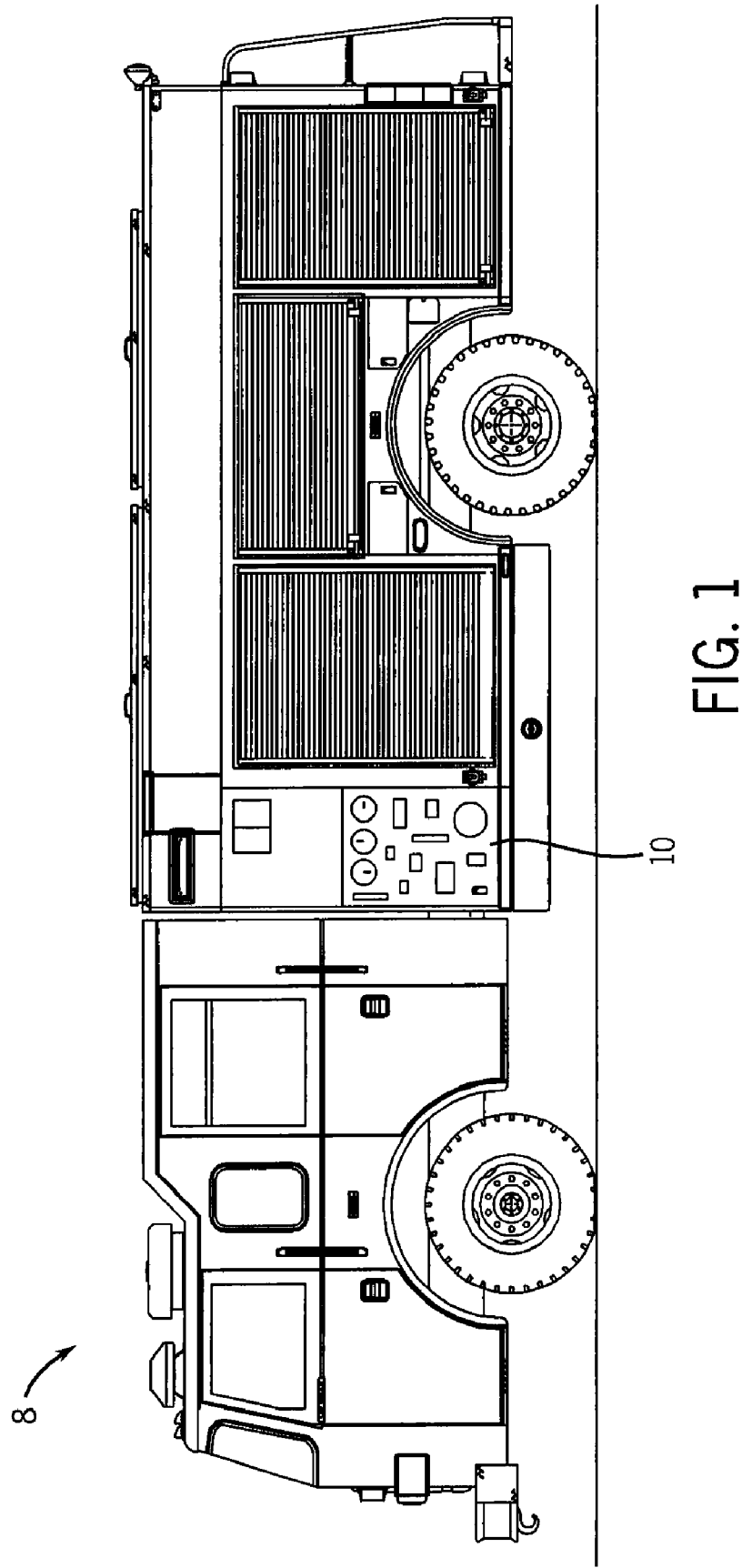
FIG. 1 illustrates fire fighting equipment with electronically controlled direct injection foam delivery system.

Referring to FIG. 1, a fire truck 8 is shown as a unit of fire fighting equipment with electronically controlled direct injection foam delivery system 10 mounted within the fire truck. Fire truck 8 contains a number of compartments and support frames for housing the foam delivery system. Electronically controlled direct injection foam delivery system 10 may also be mounted on fireboats, airplanes, helicopters, and portable fire fighting equipment.

Foam delivery system 10 is direct injection, electronically controlled and uses differential conductivity sensing to regulate foam concentration in the water stream for fire fighting applications. Fire fighting departments, companies, and brigades operating in urban and rural settings use the equipment shown in FIG. 1 to fight fires and maintain public safety. Conductivity-based electronically controlled direct injection foam delivery system 10 provides substantial advantages over prior foam delivery systems.

Figure 2:
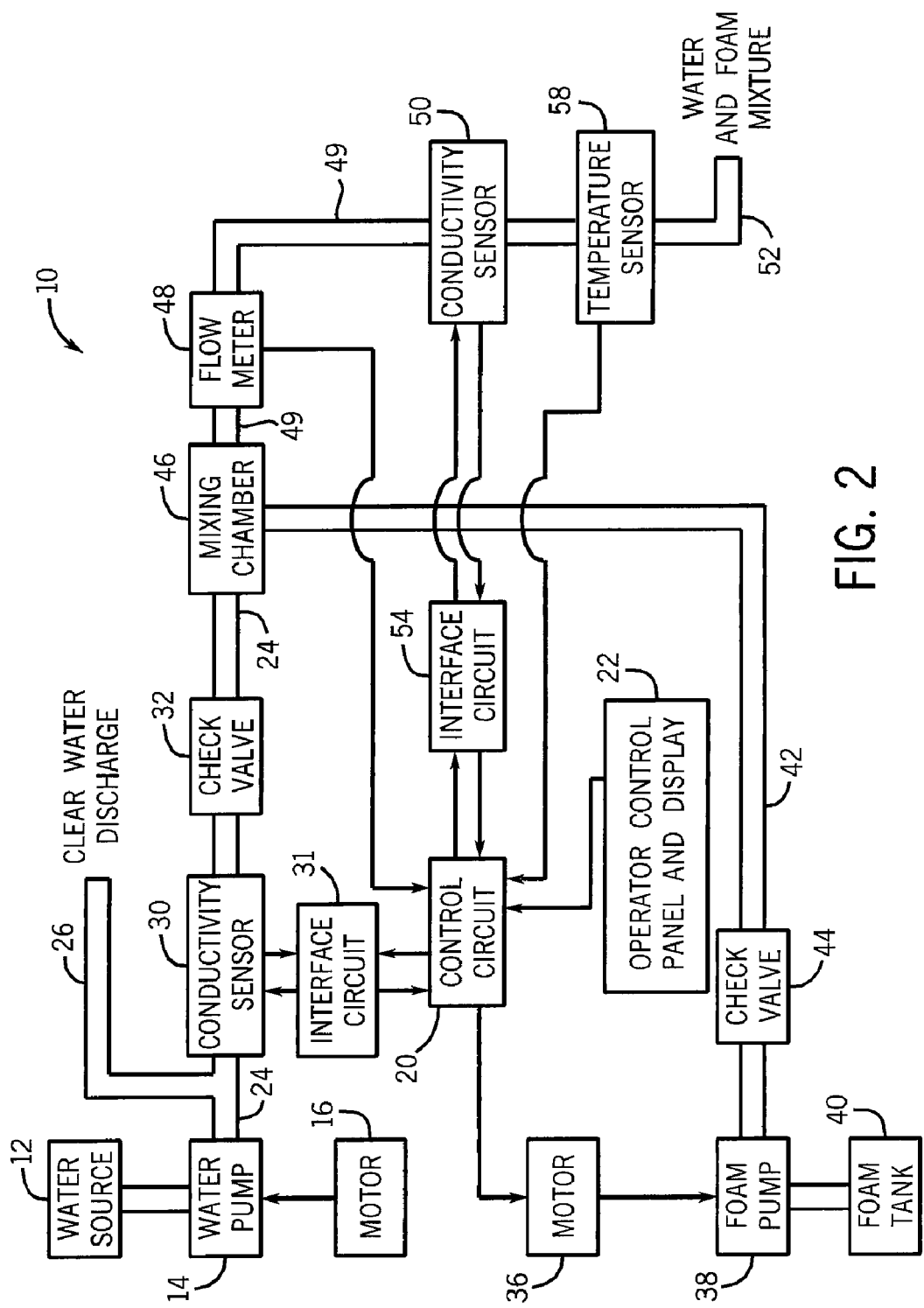
FIG. 2 is a block diagram of the electronically controlled direct injection foam delivery system.

A block diagram of electronically controlled direct injection foam delivery system 10 is shown in FIG. 2. A manual valve or pressure regulator sets the water flow rate from water source 12. Water source 12 may be a fire hydrant, tanker truck, or fixed body of water. The water is pumped by water pump 14 with motor 16 acting as the prime mover to operate the water pump. Motor 16 can be electric, diesel, or gasoline combustion engine. Motor 16 may have a separate operator control panel.

Control unit 20 contains a microprocessor or other logic circuits for processing operator commands, receiving sensor information, executing software programs, and generating control signals. Control unit 20 contains non-volatile and electronic memory storage for the software programs to execute within the microprocessor and control foam delivery system 10. Control unit 20 further includes driver circuits to control external systems such as motor 36.

The system operator, e.g., fire truck engineer, can set controls manually with hand-operated valves and levers, or enters commands by way of operator control panel and display 22. The system operator enters the foam proportioning ratio in terms of percentage of foam concentrate in the water through operator control panel 22. Control unit 20 receives the water pump flow rate command and generates a 0-10 volt control signal to motor 16, which in turn spins water pump 14 to draw water from water source 12. Water pump 14 pumps water into pipe, manifold, hose, or conduit 24 at the specified flow rate. Water pump 14 may also pump out clear water discharge, i.e., no foam content, by way of manifold 26.

The water stream has a flow rate determined by the pressure introduced by water pump 14 and the diameter of pipe or hose 24. The water also has certain electrochemical properties known as conductivity, which is a measure of the mineral, foreign matter, particulate content, or hardness of the water source. The water conductivity changes based on the location, region, and source of the water. The water hardness may vary from de-ionized water, i.e., substantially no particulates, to very harsh water such as seawater. Conductivity sensor 30 is placed in-line in pipe 24 to measure the conductivity of water in pipe 24. Conductivity sensor 30 is a precision mohms conductivity sensor. Conductivity sensor 30 measures the conductivity value of the water prior to introduction of any foam concentrate. The conductivity measure is sent to control unit 20 by way of interface circuit 31 for providing a baseline or reference point of water conductivity. The baseline water conductivity reference point is regularly updated, say six times per second, in control unit 20 by conductivity sensor 30. Check valve 32 is also placed in-line in pipe 24 to prevent any reverse flow back toward the water source.

Control unit 20 also sends a 0-10 volt control signal to motor 36. Motor 36 is the prime mover to operate foam pump 38. Motor 36 is typically an electric motor, but may be implemented as a diesel or gasoline combustion engine, water-driven motor, or hydraulically driven motor. Foam pump 38 draws foam concentrate or other fire retardant or chemical agent from foam tank 40. Foam pump 38 pumps the foam concentrate into pipe 42 at the specified flow rate. Check valve 44 may be placed in-line in pipe 42 to prevent any reverse flow from pipe 42 back into foam tank 40.

Mixing chamber 46 directly injects the foam concentrate from pipe 42 into the main water stream in pipe 24. Mixing chamber 46 may be a pipe union, "T", or "Y" connecting pipe 42 into the main stream pipe 24. Alternatively, mixing chamber 46 may provide a circular or turbulent mixing operation to thoroughly blend and mix the foam concentrate into the water stream.

Flow meter 48 is placed in-line in pipe 49. Flow meter 48 has an impeller or paddle wheel driven velocity flow sensor 286 which monitors the flow rate of the water-foam mixture in pipe 49 following mixing chamber 46. The flow meter reading is sent to control unit 20 to provide a real-time measure of the water-foam flow rate. Flow meter 48 may be placed anywhere along pipes 24 or 49, e.g., between conductivity sensor 30 and check valve 32.

The water-foam mixture in pipe 49, following mixing chamber 46, contains a certain percentage or concentration based on the volume of foam from pump 38 and the volume of water from pump 14. The water-foam mixture also has conductivity as determined by the conductivity of foam in the water stream and the conductivity of the water itself. The conductivity attributed to the foam is proportional to the concentration of foam in the water.

The mixture must maintain the proper ratio of foam and water to be effective as a fire fighting agent. By knowing the conductivity of the water-foam mixture, and conductivity of the water, the percent concentration of the foam in the water can be determined. If the conductivity of the water is subtracted from the conductivity of the water-foam mixture, the difference is that portion of the conductivity attributed to the foam itself. The concentration of the foam in the water can then be derived from the conductivity attributed to the foam. In other words, the differential conductivity of the water and water-foam mixture is an indicator of the percent concentration of the foam in the water stream necessary to maintain the effectiveness of the water-foam mixture as a fire fighting agent.

The conductivity of the water is measured by conductivity sensor 30. To measure the conductivity of the water-foam mixture, conductivity sensor 50 is placed in-line with pipe 49. Similar to conductivity sensor 30, conductivity sensor 50 sends signals to and receives signals from control unit 20 by way of interface circuit 54.

Figure 3:
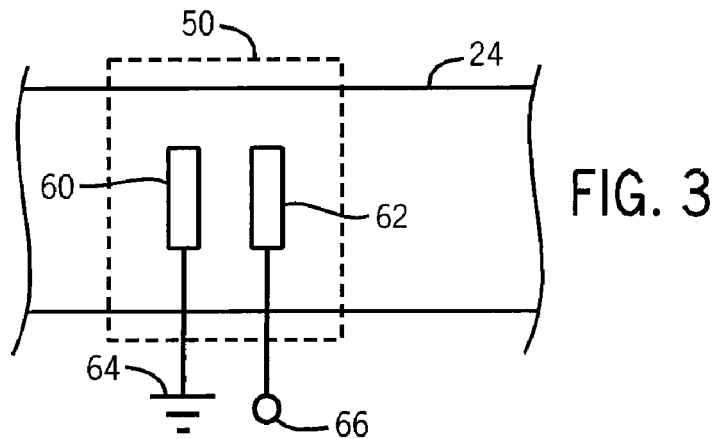
FIG. 3 illustrates further detail of the mixture conductivity sensor.

Further detail of conductivity sensors 30 and 50 is shown in FIG. 3. Conductivity sensors 30 and 50 are precision mohms conductivity sensors positioned in-line with pipe 24 and 49, before and after mixing chamber 46, in order to read and report the conductivity of water alone and the combined water and foam mixture. Conductive plate or wires 60 and 62 are placed in the flow stream of the pipe. Plates 60 and 62 are made with stainless steel or other non-corrosive metal, and have equal mass. Plate 60 is coupled to ground with conductor 64, and plate 62 is coupled to conductor 66.

Figure 4:
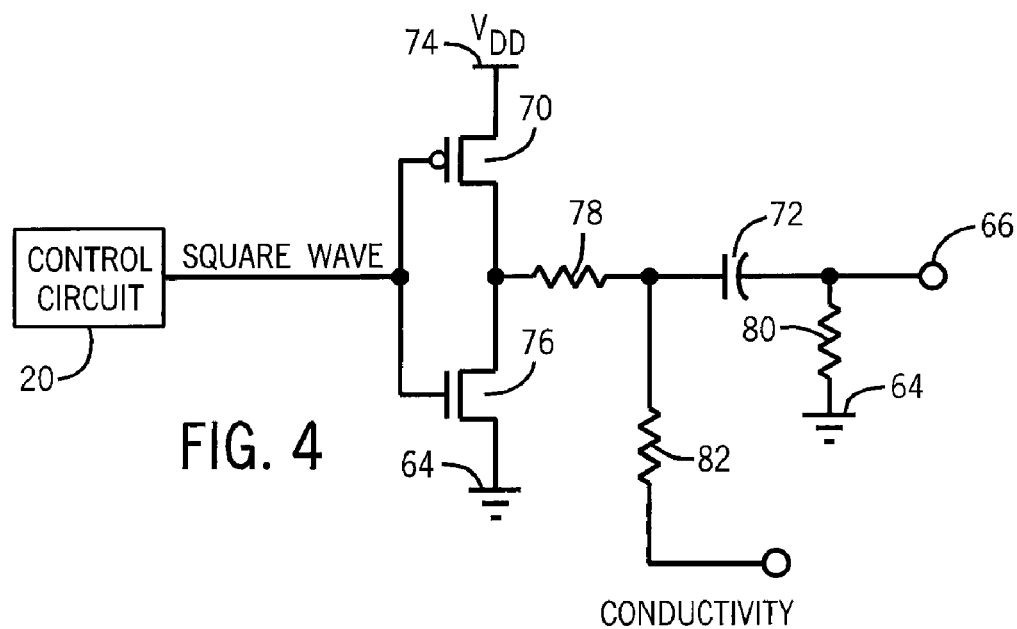
FIG. 4 illustrates further detail of the conductivity sensor interface circuit.

An embodiment of the interface circuits 31 and 54 is shown in FIG. 4. Control unit 20 provides a digital square wave signal operating at known frequency, say 1 kHz, and precise 50% duty cycle. When the digital signal is logic zero, p-channel field effect transistor 70 conducts and charges capacitor 72 through resistor 78 with the voltage on power supply conductor 74. Capacitor 72 is selected as a 10 microfarad, 10% variance, ceramic capacitor. The power supply conductor 74 operates at $V_{DD}$=5 volts DC (VDC). When the digital signal is logic one, n-channel field effect transistor 76 conducts and discharges capacitor 72 through resistor 78 with the voltage on power supply conductor 64, which operates at ground potential. When the plate of capacitor 72 at the junction between transistors 70 and 76 is pulled to ground, the voltage on the other plate of capacitor 72, i.e., on conductor 66, reverses polarity to −5 VDC. Hence, the voltage on conductor 66 as developed across resistor 80 alternates from +5 VDC to −5 VDC with the frequency and duty cycle of the digital signal.

While the voltage on conductor 66 swings from +5 volts DC to −5 volts DC, the steady state differential voltage on plates 60 and 62 remains a constant 5 volts. The 50% duty cycle of the differential voltage reduces electroplating effects on plates 60 and 62. Without the precise 50% duty cycle, the minerals, impurities, and particulate content of the water-foam mixture could adhere to plates 60 and 62, causing errors in the conductivity reading and maintenance problems.

The conductivity measure is provided through resistor 82 as the CONDUCTIVITY signal, which is sent to an analog to digital converter within control unit 20 in FIG. 2 to sample the voltage on conductor 66. The voltage is measured at the high point, i.e., when conductor 66 is +5 volts DC, and again measured at the low point, i.e., when conductor 66 is −5 volts DC. The high point above ground is the same proportion as the low point below ground. The high measurement is subtracted from the low measurement to give a difference or offset resistance value, which is proportional to the conductivity of the fluid being measured. The offset resistance value is representative of and proportional to the titration of the fluid being measured.

The resistance measurement between plates 60 and 62 is determined by the electrochemical conduction properties of the water or water-foam mixture. As stated above, the water conductivity can change depending on the hardness of the water source. The water-foam mixture conductivity can change with the concentration of foam in the water. The greater the concentration of impurities and particulate content, the lesser the resistance and conductivity measurement. The lesser the concentration of impurities and particulate content, the greater the resistance and conductivity measurement.

Returning to FIG. 2, the conductivity signals from sensors 30 and 50 are sent to control unit 20. The concentration of impurities and particulate content in the water-foam mixture is a function of the percent concentration of foam in the water stream and the base conductivity of the water. Control unit 20 subtracts the base conductivity of water from the conductivity of the water-foam mixture to determine the difference between the two measurements, i.e., the differential conductivity measurement. The differential conductivity measurement represents the conductivity attributed to the foam, which is proportional to the concentration of foam in the water. The greater the differential conductivity measurement, the greater the percent concentration of foam in the water stream. The lesser the differential conductivity measurement, the lesser the percent concentration of foam in the water stream.

Control unit 20 uses the differential conductivity measurement to control motor 36 to increase or decrease the flow rate of foam pump 38 to maintain the conductivity of the water-foam mixture in pipe 49 at a desired value or within a proper range. As the conductivity of the water-foam mixture increases or decreases from its set value, the differential conductivity measure changes accordingly and foam pump 38 adjusts the foam flow rate to maintain the desired percent concentration of foam in the water stream. If the differential conductivity increases, then the foam flow rate decreases. If the differential conductivity decreases, then the foam flow rate increases. Thus, conductivity sensors 30 and 50 provide feedback information based on conductivity measure which is representative of the actual foam concentration in the water to regulate the flow rate of foam pump 38. The proper conductivity ranges of the water and water-foam mixture translate to the correct percent concentration of foam in the water stream.

Prior to discharge, the temperature of the water-foam mixture is measured by temperature sensor 58. An electrical signal representative of the temperature of the water-foam mixture is routed to control unit 20. The conductivity of water changes 0.1% per degree C. Cooler water requires a higher foam concentrate to water ratio to achieve the same result. Control unit 20 contains a number of temperature thresholds that cause the foam pump to inject additional foam concentrate. By measuring the water-foam temperature, control unit 20 can apply a correction factor to compensate for any change in water temperature. In an alternate embodiment, temperature sensor 58 can be positioned in-line anywhere in pipes 24 or 49, before or after the foam concentrate is injected.

The water-foam mixture having the correct percent concentration of foam is projected from manifold 52 to effectively fight fires. In one embodiment, the foam fire retardant in foam tank 40 is a class A foam available under various trade names. Class A foam is useful for fires involving solid combustibles, building materials, structures, rubbish, vehicles, industrial, marine, wildlands, and the like. Other classes of foam can be stored in foam tank 40 and used with system 10. For example, class B foam is used for flammable liquid fires, class C foam is more effective against electrical fires, and class D foam is best suited for combustible metals. Tank 40 may contain other fire retardants and chemical agents.

Fires require heat, oxygen, and fuel, known as the fire triangle, to continue burning. Water alone reduces the heat portion of the fire interaction. A water-foam mixture offers the advantage of attacking all three legs of the fire triangle. The foam coats the fuel and isolates the heat and oxygen. The foam also reduces water droplet size to more effectively reduce heat. For many types of fires, the use of water-foam mixture extinguishes fires more quickly, requires less water, reduces property damage, and preserves arson-related evidence.

Figure 5:
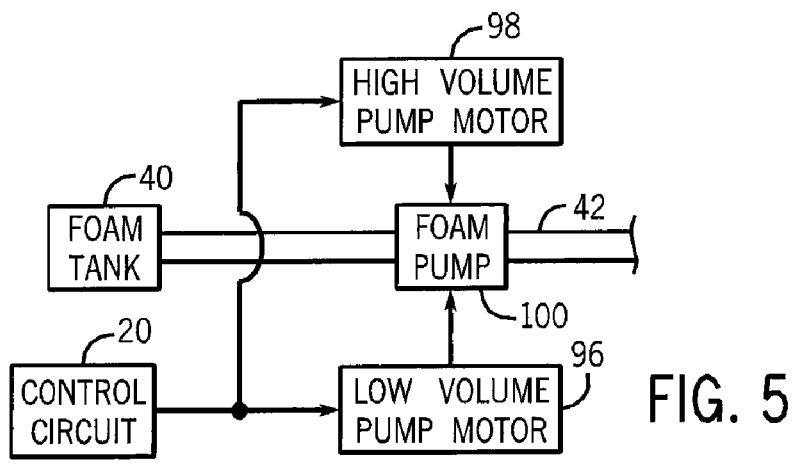
FIG. 5 illustrates foam delivery subsystem using high volume motor and low volume motor.

Turning to FIG. 5, an alternate embodiment of foam pump 38 is shown including low volume motor 96 and high volume motor 98 driving a common foam pump 100. The dynamics of foam pump 38 being driven by a single high volume motor 36 are such that it becomes difficult to maintain accurate titration in the water-foam mixture at low water flow rates and low percent foam concentrations, due to the inability to sufficiently and accurately slow down the high flow pump motor. To solve the low water flow rate and low percent foam concentration problem, control unit 20 selects either low volume motor 96 or high volume motor 98 to drive foam pump 100 based on the titration set point and water flow rate. The water flow rate is determined by flow meter 48. Low volume motor 96 is used when the titration has a low set point, e.g., on the order of 0.3% foam at 10 GPM water flow rate. Control unit 20 controls low volume motor 96 to set the flow rate of foam pump 100. High volume motor 98 is used at higher titration set points and water flow rates. Control unit 20 controls high volume motor 98 to set the flow rate of foam pump 100.

The conductivity measurements are sent to control unit 20 where the conductivity value of the final discharge mixture is compared with the operated-entered conductivity set point according to the conductivity table. For low titration levels and low water flow rates, if the measured conductivity is less than the conductivity set point, then control unit 20 causes low volume motor 96 to increase the flow rate of the foam from pump 100. Again, for low titration levels and low water flow rates, if the measured conductivity is greater than the conductivity set point, then control unit 20 causes low volume motor 96 to decrease the flow rate of the foam from pump 100. For higher titration levels and higher water flow rates, if the measured conductivity is less than the conductivity set point, then control unit 20 causes high volume motor 98 to increase the flow rate of the foam from pump 100. Again, for higher titration levels and higher water flow rates, if the measured conductivity is greater than the conductivity set point, then control unit 20 causes high volume motor 98 to decrease the flow rate of the foam from pump 100.

By measuring the actual conductivity of the water and water-foam mixture and comparing the measured conductivity to the conductivity set point, for the given water conductivity, control unit 20 can maintain the correct percent concentration in foam in the water stream for discharge from manifold 52. Control unit 20 automatically selects between the low volume pump motor 96 and the high volume motor 98. The low volume motor 96 driving foam pump 100 is better suited for the low titration levels and low water flow rates. The high volume motor 98 driving foam pump 100 is better suited for the higher titration levels and higher water flow rates.

Figure 6:
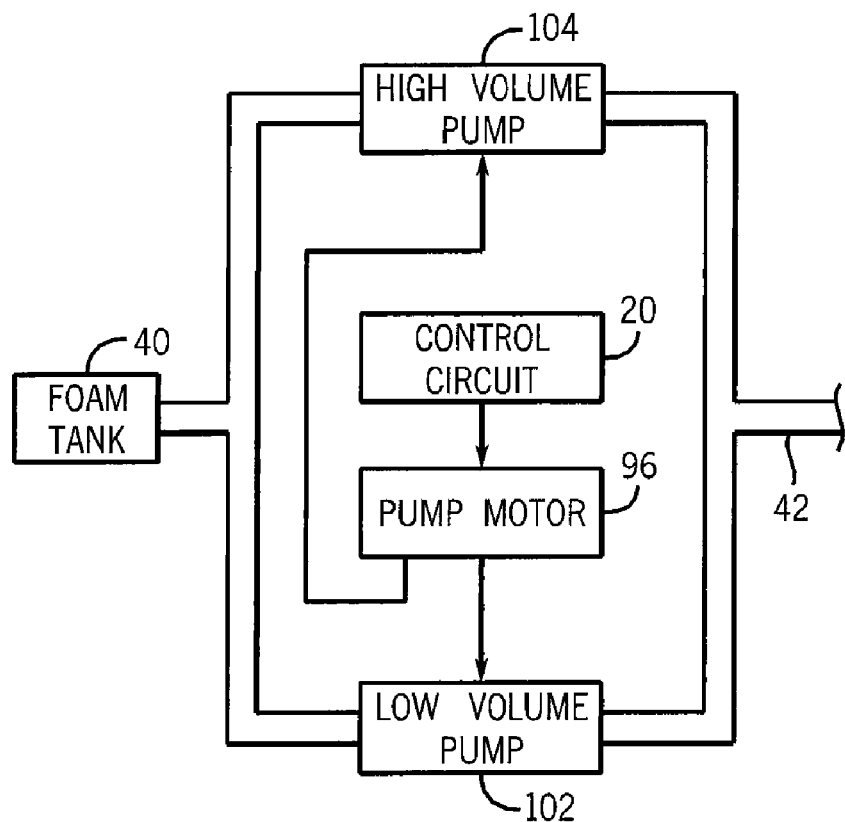
FIG. 6 illustrates foam delivery subsystem using high volume pump and low volume pump.

In FIG. 6, control circuit 20 controls the pump motor 96 to drive low volume foam pump 102 and high volume foam pump 104. Control unit 20 selects either low volume foam pump 102 or high volume foam pump 104 based on the titration set point and water flow rate. Again, the water flow rate is determined by flow meter 48. Low volume pump 102 is used when the titration has a low set point, e.g., on the order of 0.3% foam at 10 GPM water flow rate. High volume foam pump 104 is used at higher titration set points and water flow rates.

Figure 7:
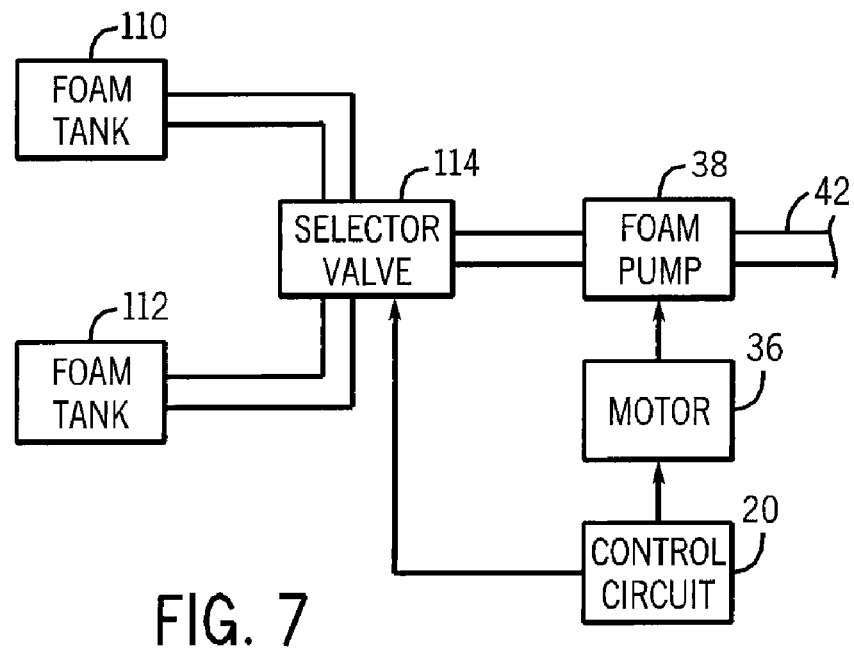
FIG. 7 illustrates foam delivery subsystem accessing different foams from different tanks.

In FIG. 7, foam tank 110 contains a first type of foam, e.g., class A foam, and foam tank 112 contains a second type of foam, e.g., class B foam. Selector valve 114 selects between foam tank 110 and foam tank 112. Control unit 20 controls selector valve 114 in response to system operator input via operator control panel and display 22. Control unit 20 further controls motor 36 to spin foam pump 38 and pump the selected foam through pipe 42. The dual foam tank system can be used with the dual volume pump system discussed in FIG. 5 or 6.

Figure 8:
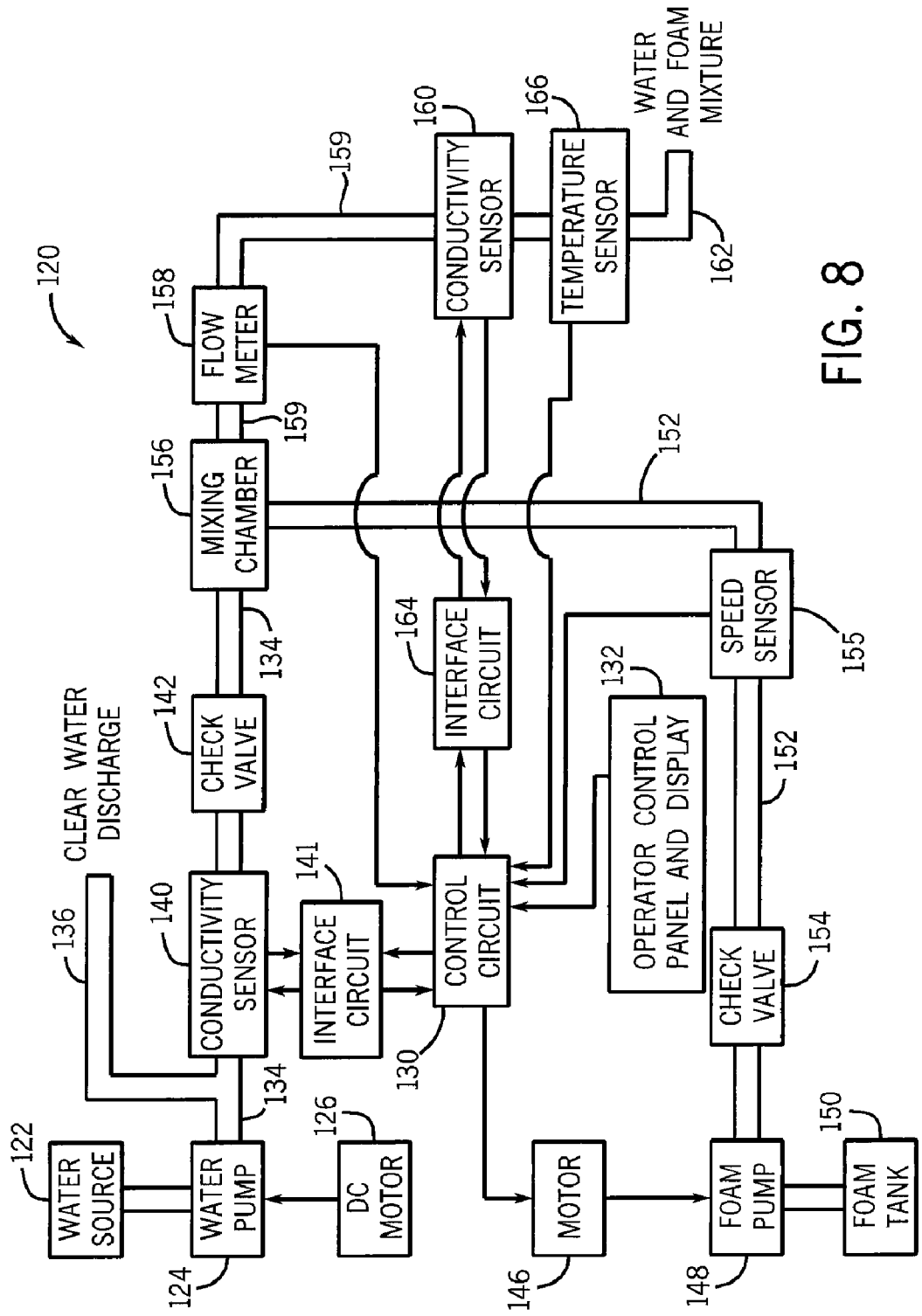
FIG. 8 is a block diagram of an alternate embodiment of the electronically controlled direct injection foam delivery system.

In an alternate embodiment, a block diagram of electronically controlled direct injection foam delivery system 120 is shown in FIG. 8. A manual valve or pressure regulator sets the water flow rate from water source 122 into pipe 134. Water source 122 may be a fire hydrant, tanker truck, or fixed body of water. Alternately, water from water source 122 can be pumped by water pump 124. In this case, motor 126 is the prime mover to operate water pump 124. Motor 126 can be electric, diesel, or gasoline combustion engine. Motor 126 may have separate operator control panel or receive control signals from control unit 130. Control unit 130 contains a microprocessor or other logic circuits for processing operator commands, receiving sensor information, executing software programs, generating control signals, and displaying system status LEDs. Control unit 130 sends system status information to display 132. Control unit 130 contains non-volatile and electronic memory storage capacity for software programs to execute within the microprocessor and control foam delivery system 120. Control unit 130 further includes driver circuits to control external systems such as motor 126 and motor 146.

The system operator, e.g., fire truck engineer, can set controls manually with hand-operated valves and levers, or enters commands by way of operator control panel and display 132. The system operator enters the foam proportioning ratio in terms of percentage of foam concentrate in the water through operator control panel 132. The foam proportioning ratio can also be automatically set by the software program executing in control unit 130. Control unit 130 receives the water pump flow rate command and generates a 0-10 volt control signal to motor 126, which in turn spins water pump 124 to draw water from water source 122. Water pump 124 pumps water into pipe, manifold, hose, or conduit 134 at the specified flow rate.

Water pump 124 may also pump out clear water discharge, i.e., no foam content, by way of manifold 136.

The water stream has a flow rate determined by the pressure introduced by water pump 124 and the diameter of pipe or hose 134. Conductivity sensor 140 is placed in-line in pipe 134 to measure the conductivity of water in pipe 134. Conductivity sensor 140 is a precision mohms conductivity sensor. Conductivity sensor 140 measures the conductivity value of the water prior to introduction of any foam concentrate. The conductivity measure is sent to control unit 130 through interface circuit 141 for providing a baseline or reference point of water conductivity. The baseline water conductivity reference point is regularly updated in control unit 130 by conductivity sensor 140. Check valve 142 is also placed in-line in pipe 134 to prevent any reverse flow back toward the water source.

Control unit 130 also sends a 0-10 volt control signal to motor 146. Motor 146 is the prime mover to operate foam pump 148. Motor 146 is typically a DC electric motor, but may be implemented as a diesel or gasoline combustion engine, water-driven motor, or hydraulically driven motor. Foam pump 148 draws foam concentrate or other fire retardant or chemical agent from foam tank 150.

The system may use the high and low volume pumps as described in FIGS. 5 and 6, and the two foam tanks as described in FIG. 7. Foam pump 148 pumps the foam concentrate into pipe 152 at the specified flow rate. Check valve 154 may be placed in-line in pipe 152 to prevent any reverse flow from pipe 152 back into foam tank 150.

Speed sensor 155 is placed in-line with pipe 154 to provide a flow rate of the foam concentrate. Speed sensor 155 includes a wheel 278 with a plurality of teeth 280, say 30-40 teeth, that each generate an electrical pulse as the wheel rotates. One pulse per tooth movement in response to the flow of foam concentrate. Forty electrical pulses could indicate one revolution of the speed sensor wheel which translates to a specific volume of foam passing through the speed sensor. The pulses are sent to control unit 130, which adds a scaling factor to convert to any specified units of volume per unit time. For example, the foam flow rate may be gallons or liters per minute. Control unit 130 tracks instantaneous foam concentrate flow rate, as well as cumulative foam concentrate usage. The flow rate tracked over a period of time provides total foam concentrated used in any given time period. Alternatively, the speed sensor 286 can be integrated into foam pump 148 or motor 146.

Mixing chamber 156 directly injects the foam concentrate from pipe 152 into the main water stream in pipe 134. Mixing chamber 156 may be a pipe union, "T", or "Y" connecting pipe 152 into the main stream pipe 134. Alternatively, mixing chamber 156 may provide a circular or turbulent mixing operation to thoroughly blend and mix the foam concentrate into the water stream.

Flow meter 158 is placed in-line in pipe 159. Flow meter 158 has an impeller or paddle wheel driven velocity flow sensor 286 which monitors the flow rate of the water-foam mixture in pipe 159 following mixing chamber 156. Flow meter 158 generates one electrical pulse for each movement of the paddle in response to the water-foam mixture flow. The pulse count over time provides a pulse frequency, which is sent to control unit 130. The pulse frequency is a real-time measure of the water flow rate, e.g., gallons or liters per minute. Control unit 130 can track instantaneous flow rate or cumulative water-foam mixture volume over time. Flow meter 158 may be placed anywhere along pipe 134 or 159, e.g., between conductivity sensor 40 and check valve 142.

The water-foam mixture in pipe 159, following mixing chamber 156, contains a certain percentage or concentration based on the volume of foam from pump 148 and the volume of water from pump 124. The water-foam mixture also has conductivity as determined by the conductivity of foam in the water stream and the conductivity of the water itself. The conductivity attributed to the foam is proportional to the concentration of foam in the water.

The mixture must maintain the proper ratio of foam and water to be effective as a fire fighting agent. By knowing the conductivity of the water, and conductivity of the water-foam mixture, the percent concentration of the foam in the water can be determined. If the conductivity of the water is subtracted from the conductivity of the water-foam mixture, then the difference is that portion of the conductivity attributed to the foam itself. The concentration of the foam in the water can be derived from the conductivity of the foam. In other words, the differential conductivity of the water and water-foam mixture is an indicator of the percent concentration of the foam in the water stream necessary to maintain the effectiveness of the water-foam mixture as a fire fighting agent.

As described in FIGS. 3 and 4, conductivity sensor 140 is placed in-line with pipe 134 to measure the conductivity of the water supply. Likewise, conductivity sensor 160 is placed in-line with pipe 159 to measure the conductivity of the water-foam mixture. Conductivity sensors 140 and 160 send signals to and receives signals from control unit 130 by way of interface circuits 141 and 164, respectively.

Control unit 130 uses the difference between the water-foam mixture conductivity and the water conductivity to control motor 146 to increase or decrease the flow rate of foam pump 148 to maintain the conductivity of the water-foam mixture in pipe 159 within a proper range. As the differential conductivity increases or decreases from its set value, foam pump 148 adjusts the foam flow rate to maintain the desired percent concentration of foam in the water stream. If the differential conductivity increases, then the foam flow rate decreases. If the differential conductivity decreases, then the foam flow rate increases. Thus, conductivity sensors 140 and 160 provide the feedback information needed to determine the differential conductivity measure, which is representative of the actual foam concentration in the water to regulate the flow rate of foam pump 148. The proper conductivity range of the water-foam mixture translates to the correct percent concentration of foam in the water stream.

Prior to discharge, the temperature of the water-foam mixture is measured by temperature sensor 166. An electrical signal representative of the temperature of the water-foam mixture is routed to control unit 130. The conductivity of water changes 0.1% per degree C. Cooler water requires a higher foam concentrate to water ratio to achieve the same result. Control unit 130 contains a number of temperature thresholds that cause the foam pump to inject additional foam concentrate. By measuring the water-foam temperature, control unit 120 can apply a correction factor to compensate for any change in water temperature. In an alternate embodiment, temperature sensor 166 can be positioned in-line anywhere in pipes 134 or 159, before or after the foam concentrate is injected. The water-foam mixture having the correct percent concentration of foam is projected from manifold 162 to effectively fight fires.

Figure 9:
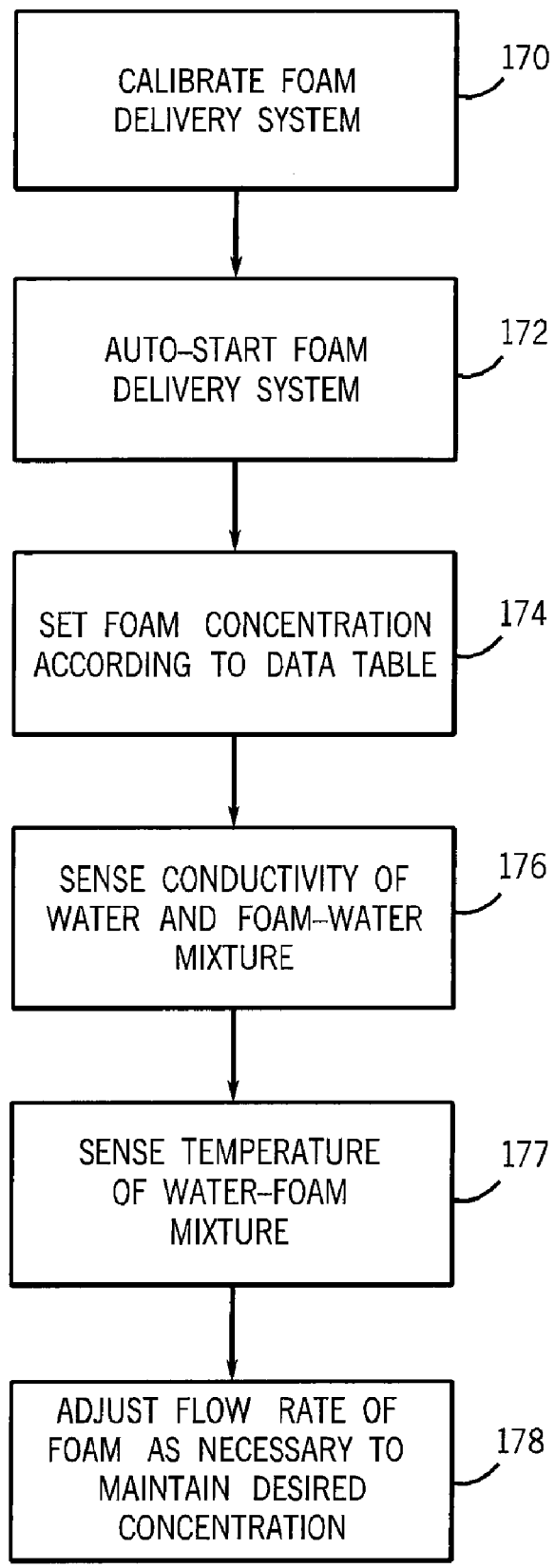
FIG. 9 illustrates a process of controlling the foam delivery system.

FIG. 9 illustrates the steps involved in using direct injection foam delivery system 120. The steps described herein can be implemented as software programs executing in the microprocessor and memory of control unit 130.

In step 170, the direct injection foam delivery system 120 is initially calibrated. The relationship between conductivity of the water-foam mixture and the percent concentration of foam in the water stream is determined in a calibration process. A known manufacturer and quality of foam concentrate is used as a benchmark. The calibration process measures conductivity of the water-foam mixture over a range of foam concentrations. The foam concentrations, ranging from 0.1% to 1.0% in 0.1% increments, 3.0% and 6.0% concentrate in solution, are established in the water stream of pipe 134. At each known step of solution concentration, the conductivity is measured. The process is repeated for a range of water conductivity levels. A table of conductivity measures and corresponding foam concentrations for each level of water-only conductivity is created and stored in the memory of control unit 130.

In step 172, the foam delivery system 120 undergoes autostart, which can be triggered by application of the power supply to the system or by sensing water pressure from water source 122. Alternatively, the foam delivery system can be manually started by the operator with a push-button. The water pump flow rate is set automatically or through operator control panel and display 132. Likewise, the conductivity set point is selected automatically or through operator control panel and display 132 according to the data table stored in the memory of control unit 130. The water volume flow rate and conductivity set point or foam concentration level are displayed to provide information as to system settings. Any units of measure can be displayed for the convenience of the operator. The conductivity set point is representative of the intended conductivity of the final proportionate water-foam mixture and determines the percentage or concentration of foam in the water stream of pipe 159. A higher conductivity set point translates to a higher percent concentration of foam in the water stream; a lower conductivity set point corresponds to a lower percent concentration of foam in the water stream. The conductivity set point is an accurate measure of the total titration of the water-foam mixture and, by direct relationship, the actual concentration of foam in the water stream. The conductivity of the water-foam mixture in pipe 159 changes in proportion to the foam concentration.

The foam delivery system 120 starts with water flow only. The system runs for a few seconds to purge any foam from the pipes and get a conductivity measurement of water only on both sides of mixing chamber 156. The water-only measurement by conductivity sensors 140 and 160 allows the system to zero out any measurement offset in the sensors.

After the line purge and zero offset of the conductivity sensors, the control unit 130 sets the flow concentration according to the conductivity set point from the data table, as per step 174. Foam concentrate flows through pipe 134 into mixing chamber 156. The foam-water mixture flows out through manifold 162.

In step 176, the conductivity of the water is measured by conductivity sensor 140, the conductivity of the water-foam mixture is measured by conductivity sensor 160, and the readings are sent to control unit 130. In step 177, the temperature of the water-foam mixture is measured to compensate for any change in water temperature. The difference between the two conductivity readings is compared with the conductivity set point according to the conductivity table.

For a specific water conductivity, the conductivity table translates to the conductivity set point for the desired foam concentration in the water-foam mixture. In step 178, the flow rate of the foam is adjusted as necessary to maintain the desired foam concentration. If the differential conductivity measurement is less than the conductivity set point, then control unit 130 causes motor 146 to increase the flow rate of the foam from pump 148. If the differential conductivity measurement is greater than the conductivity set point, then control unit 130 causes motor 146 to decrease the flow rate of the foam from pump 148. The foam concentration in the final discharge mixture can also be controlled by adjusting the flow rate of water pump 124. By measuring the actual conductivity measurements and comparing the measured conductivity value to the conductivity set point for the given water conductivity, control unit 130 can maintain the correct percent concentration of foam in the water stream for discharge from manifold 162. The feedback system compensates for errors, misalignment, and miscalibrations in system 120 and achieves a proper foam concentration to effectively and efficiently fight fires and at the same time reduces foam concentrate waste.

Control unit 130 produces an audible or visual alarm if it is unable to correct the conductivity of the water-foam mixture to match the conductivity set point by altering the foam pump flow rate. The system switches to volumetric control of the foam concentration if it is unable to compensate by the conductivity measure. The operator can check the system for problems; perhaps the foam tank is empty or contains the wrong product. The foam delivery system 120 uses a foam tank float sensor to detect low foam concentrate.

Figure 10:
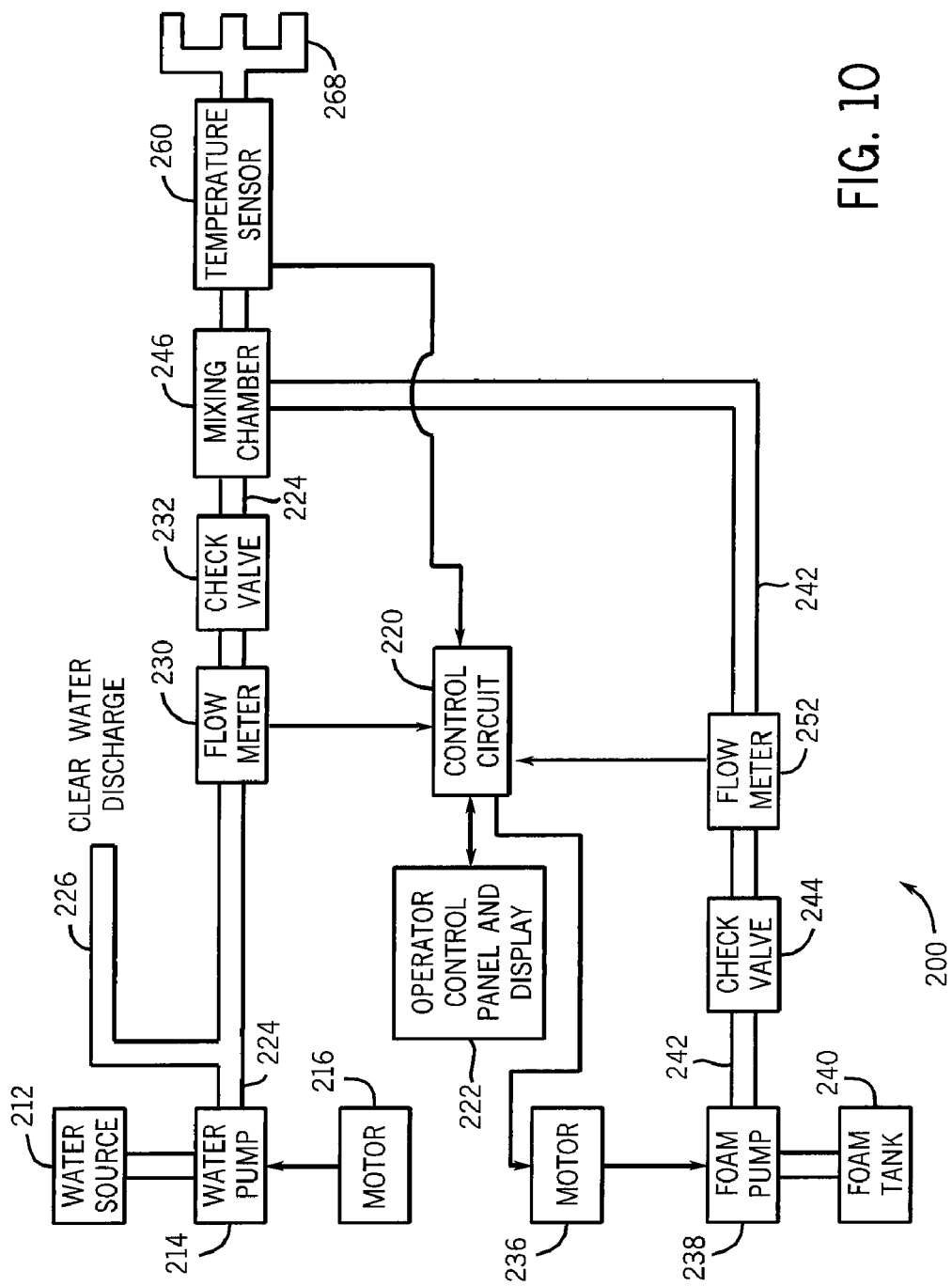
FIG. 10 is a block diagram of an alternate embodiment of the electronically controlled direct injection foam delivery system with water flow control and temperature compensation.

In an alternate embodiment, a block diagram of electronically controlled, direct injection foam delivery system 200 is shown in FIG. 10. A manual valve or pressure regulator sets the water flow rate from water source 212 into pipe 224. Water source 212 may be a fire hydrant, tanker truck, or fixed body of water. The water is pumped by water pump 214 with motor 216 acting as the prime mover to operate water pump 214. Motor 216 can be an electric, diesel, or gasoline combustion engine.

Control unit 220 contains a microprocessor or other logic circuits for processing operator commands, receiving sensor information, executing software programs, and generating control signals. Control unit 220 contains non-volatile and electronic memory storage for the software programs to execute within the microprocessor and control foam delivery system 200. Control unit 220 further includes driver circuits to control external systems such as motor 236.

The system operator, e.g., fire truck engineer, can set controls manually with hand-operated valves and levers, or enters commands by way of operator control panel and display 222. The system operator enters the foam proportioning or mixing ratio in terms of percentage of foam concentrate in the water through operator control panel 222. Control unit 220 receives the water pump flow rate command and generates a 0-10 volt control signal to motor 216, which in turn spins water pump 214 to draw water from water source 212. Motor 216 may have a separate operator control panel. Water pump 214 pumps water into pipe, manifold, hose, or conduit 224. Water pump 214 may also pump out clear water discharge, i.e., no foam content, by way of manifold 226.

The water stream has a flow rate determined by the pressure introduced by water pump 214 and the diameter of pipe or hose 224. Flow meter 230 is placed in-line in pipe 224 to measure the flow rate of the water. An electrical signal representative of the water flow rate, e.g., square wave or pulses with a frequency proportional to flow rate, is routed to control unit 220. For example, thirty pulses in one second may equate to one gallon per second. The system can be calibrated to other units of measure, e.g., liters and imperial gallons. Check valve 232 is also placed in-line in pipe 224 to prevent any reverse flow back toward the water source.

In one embodiment, flow meter 230 is a paddle wheel type sensor 286, which produces a series of pulses or samples corresponding to the movement of the paddle wheel 278 in response to the flow of water. The paddle wheel has a number of teeth or paddles 280 which rotate with the water to sense its flow rate. Typically, about one half of each paddle extends into the flow stream 282. The water flowing through the pipe causes the paddle wheel to spin. Magnets are embedded in the paddle 280. As the magnets pass the sensor 284, an electrical signal is produced. The electrical signal is proportional to the rate of flow. In AC coil sensors, an analog signal, e.g., sine wave, is produced that is proportional to the flow rate. In Hall Effect sensors, a digital square wave is generated that is proportional to the flow rate. The frequency of the pulses is approximately proportional to the flow rate of the water. However, there is some non-linearity between the pulse count and actual velocity of the fluid due to diameter of the pipe, viscosity of the fluid, rate of flow, wear on paddles, air in the line, and laminar flow profile. Accordingly, control unit 220 linearizes the flow rate sample count, as discussed below, to increase the accuracy of the reading.

Control unit 220 also sends a 0-10 volt control signal to motor 236. Motor 236 is the prime mover to operate foam pump 238. Motor 236 is typically an electric motor, but may be implemented as a diesel or gasoline combustion engine, water-driven motor, or hydraulically driven motor. Foam pump 238 draws foam concentrate or other fire retardant or chemical agent from foam tank 240. Foam pump 238 pumps the foam concentrate into pipe 242 at the specified flow rate. In one embodiment, the foam fire retardant in foam tank 240 is a class A foam available under various trade names. Class A foam is useful for fires involving solid combustibles, building materials, structures, rubbish, vehicles, industrial, marine, wildlands, and the like. Other classes of foam can be stored in foam tank 240 and used with system 200. For example, class B foam is used for flammable liquid fires, class C foam is more effective against electrical fires, and class D foam is best suited for combustible metals. Tank 240 may contain other fire retardants and chemical agents.

Fires require heat, oxygen, and fuel, known as the fire triangle, to continue burning. Water alone reduces the heat portion of the fire interaction. A water-foam mixture offers the advantage of attacking all three legs of the fire triangle. The foam coats the fuel and isolates the heat and oxygen. The foam also reduces water droplet size to more effectively reduce heat. For many types of fires, the use of water-foam mixture extinguishes fires more quickly, requires less water, reduces property damage, and preserves arson-related evidence.

Check valve 244 may be placed in-line in pipe 242 to prevent any reverse flow from pipe 242 back into foam tank 240. Flow meter 252 is placed in-line in pipe 242 to measure the flow rate of the foam. Flow meter 252 has a similar construction and operation as described for flow meter 230. Control unit 130 tracks instantaneous foam concentrate flow rate, as well as cumulative foam concentrate usage. The flow rate tracked over a period of time provides total foam concentrated used in any given time period.

Mixing chamber 246 directly injects the foam concentrate from pipe 242 into the main water stream in pipe 224. Mixing chamber 246 may be a pipe union, "T", or "Y" connecting pipe 242 into the main stream pipe 224. Alternatively, mixing chamber 246 may provide a circular or turbulent mixing operation to thoroughly blend and mix the foam concentrate into the water stream.

The water-foam mixture in pipe 249, following mixing chamber 246, contains a certain percentage or concentration based on the volume of foam from pump 238 and the volume of water from pump 214. The mixture must maintain the proper ratio of foam and water to be effective as a fire fighting agent.

Figure 11:
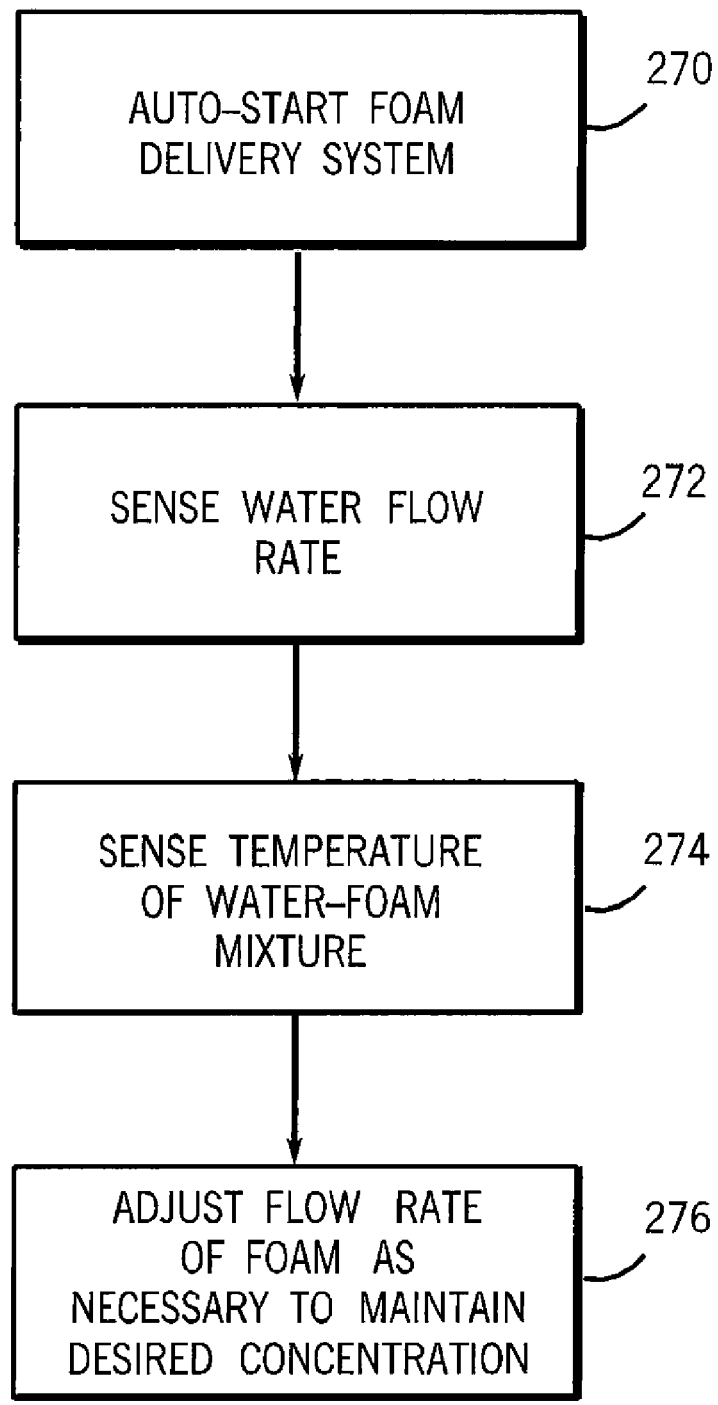
FIG. 11 illustrates a process of controlling the foam delivery system using water flow control and temperature compensation.
Figure 12:
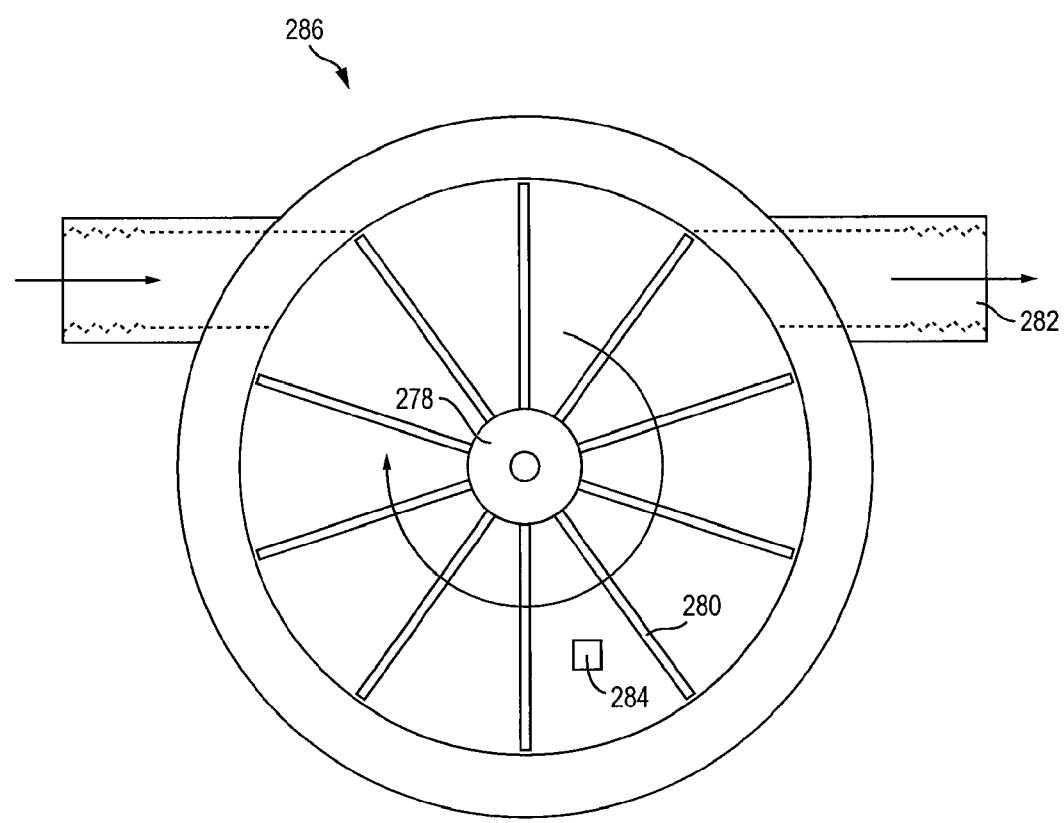
FIG. 12 illustrates a flow meter with a paddle wheel sensor.

FIG. 11 illustrates the steps involved in using direct injection foam delivery system 200. The steps described herein can be implemented as software programs executing in the microprocessor and memory of control unit 220. Control unit 220 maintains a data table for use during start-up and normal operation. For each flow rate, the data table contains entries for correction factors and initial values. For example, the data table may have entries for 20, 50, 100, 200, etc. gallon per minute (GPM) of water flow rate. For each water flow rate, the data table has a foam mixing correction factor at 0.2% water-foam mixing percentage, a foam mixing correction factor at 1% water-foam mixing percentage, an initial foam motor starting value (0-10 volt) at 0.2% water-foam mixing percentage, and an initial foam motor starting value (0-10 volt) at 1% water-foam mixing percentage. The foam mixing correction factor takes into account many variables in system 200, including K-factor and any other variables that may influence the mix ratio. Other flow rates, correction factors, mixing percentages, and initial values can be included in the data table.

In step 270, the foam delivery system 200 undergoes autostart, which can be triggered by application of the power supply to the system or by sensing water pressure from water source 212. Alternatively, the foam delivery system can be manually started by the operator using a push-button. The water pump flow rate is set automatically, or through operator control panel and display 222, or manually by the operator. Likewise, the water-foam mixing percentage is selected automatically or through operator control panel and display 222. The initial start-up control to foam pump 238 can be read from the data table for the given water-foam mixing percentage. If the mixing percentage is between data table values, then the initial start-up control to foam pump 238 can be determined by linear interpolation between table entries. For example, if the table has start-up control value for 0.2% and 1% water-foam mixing percentage, then a mixing percentage of 0.5% would be the difference in start-up control value for 1% and 0.2% times (0.5-0.2)/(1.0-0.2). The water volume flow rate and water-foam concentration level are displayed to provide information as to system settings. Any units of measure can be displayed for the convenience of the operator.

In step 272, the flow rate of the water is measured by flow meter 230 and the reading is sent to control unit 230. The flow rate signal is a frequency or count of the pulses in a sample period, e.g., 30 pulses in one second. The flow rate can change during operation. Control unit 220 regulates the concentration of foam introduced into the water stream by the readings from flow meter 230. Each type of paddle wheel sensor 286 has an associated K-factor which relates the number of output pulses produced, per volume of flow, for each specific pipe fitting. The K-factor calibrates flow rate to pipe diameter, i.e., pulses per unit of measure. The K-factor is stored in control unit 220 to correlate the amount of foam concentrate associated with each turn of the paddle wheel, i.e., each electrical pulse.

To control system 200, control unit 220 counts the number of pulses in a given sample period, e.g., pulses in one second, which translates into a volume of water passing through pipe 224 in the given time period. Control unit 220 then calculates the amount of foam to be introduced into the water stream to achieve the operator-selected mix percentage. The calculation includes the correction factor from the data table for the water-foam mixing percentage. If the mixing percentage is between data table values, then the correction factor can be determined by linear interpolation between table entries to determine the proper values to control the system. For example, if the table has correction factors for 0.2% and 1% water-foam mixing percentage, then a mixing percentage of 0.5% would be the difference between correction factors for 1% and 0.2% times (0.5−0.2)/(1.0−0.2). Thus, the measure pulses in sample period (one second), multiplied by 60 (second per minute), and divided by the correction factor, determines the water flow rate in gallons per minute. The data table allows control unit 220 to linearize the feedback control with correction factors to maintain the proper water-foam mixing percentage.

Prior to discharge, the temperature of the water-foam mixture is monitored by temperature sensor 260 in step 274. An electrical signal representative of the temperature of the water-foam mixture is routed to control unit 220. The conductivity of water changes 0.1% per degree C. Cooler water requires a higher foam concentrate to water ratio to achieve the same result. Control unit 220 contains a number of temperature thresholds that cause the foam pump to inject additional foam concentrate. By measuring the water-foam temperature, control unit 220 can apply a correction factor to the required pulse count from the pump motor to compensate for any change in water temperature. A higher temperature may cause the pulse count to increase as the viscosity of the water-foam mixture decreases. The temperature compensation would then take into account the higher pulse count in regulating the foam pump 238. A lower temperature may cause the pulse count to decrease as the viscosity of the water-foam mixture increases. The temperature compensation would then take into account the lower pulse count in regulating the foam pump 238. In an alternate embodiment, temperature sensor 260 can be positioned in-line anywhere in pipes 224 or 249, before or after the foam concentrate is injected.

Given the operator-selected mixing percentage, and the correction factor and temperature compensation, the concentration of foam in the water in pipe 249 can be adjusted in step 276 by regulating the speed of motor 236 and flow rate of foam pump 238. If the water flow rate increases, the amount of foam introduced into mixing chamber 246 is increased proportionately according to the water-foam mixing percentage, factoring in the temperature compensation and correction factor for non-linear effects. If the water flow rate decreases, the amount of foam introduced into mixing chamber 246 is decreased proportionately according to the water-foam mixing percentage, factoring in the temperature compensation and correction factor for non-linear effects. The control unit 220 may add a scaling factor to convert to any specified units of volume per unit time. For example, the foam flow rate may be gallons or liters per minute. Alternately, the water-foam concentration can be regulated by controlling the speed of motor 216 and flow rate of water pump 214. The water-foam mixture having the correct percent concentration of foam is projected from manifold 268 to effectively fight fires.

The low volume motor 96 and high volume motor 98 shown in FIG. 5 can be used with foam delivery system 200. Likewise, the low volume foam pump 102 and high volume foam pump 104 shown in FIG. 6 can be used with foam delivery system 200. In each case, the water flow rate is determined by flow meter 230. Also, different types of foam agents can be used with foam delivery system 200 as shown in FIG. 7.

While one or more embodiments of the present invention have been illustrated in detail, the skilled artisan will appreciate that modifications and adaptations to those embodiments may be made without departing from the scope of the present invention as set forth in the following claims. More specifically, while the present discussion is directed to water and fire retardant foam, the direct injection delivery system is also applicable to other fluids, liquids, and chemical agents.

What is claimed is:

1. A unit of fire fighting equipment having a direct injection foam delivery system, comprising:
    a water pump for pumping water through a first pipe;
    a foam pump for pumping foam through a second pipe;
    a mixing chamber having a first input coupled for receiving the water and a second input coupled for receiving the foam and an output for producing a water and foam mixture;
    a control unit;
    a first conductivity sensor for monitoring conductivity of the water and foam mixture and providing a first electrical signal to the control unit;
    a second conductivity sensor for monitoring conductivity of the water and providing a second electrical signal to the control unit, wherein the control unit controls the foam pump in response to a difference between the first electrical signal and second electrical signal;
    a flow meter monitors flow rate of the water and provides a third electrical signal to the control unit which in turn controls the foam pump in response to the third electrical signal; and
    a temperature sensor monitors the water and provides a fourth electrical signal to the control unit wherein:
        the control unit controls the foam pump flow for changes in water conductivity resulting from changes in water temperature, and
        the control unit applies a correction factor to the flow meter to account for changes in water viscosity resulting from changes in water temperature.

2. The unit of fire fighting equipment of claim 1, wherein the flow meter includes a paddle wheel sensor having a plurality of paddles which rotate to sense water flow.

3. The unit of fire fighting equipment of claim 1, wherein the control unit includes a microprocessor coupled for receiving the first, second, third, and fourth electrical signals and generating a control signal to regulate the foam pump and the flow meter.

4. The unit of fire fighting equipment of claim 1, further including an operator control panel coupled to the control unit for inputting a water and foam mixing ratio.

5. The unit of fire fighting equipment of claim 1, wherein the foam pump includes:
    a first foam pump providing a first range of flow rates in response to the control unit and having an output coupled to the second pipe; and
    a second foam pump providing a second range of flow rates in response to the control unit and having an output coupled to the second pipe, the second range of flow rates being greater than the first range of flow rates.

6. The unit of fire fighting equipment of claim 1, further including:
    a first foam tank for providing a first foam to the second pipe to mix with the water; and
    a second foam tank for providing a second foam to the second pipe to mix with the water.

7. The unit of fire fighting equipment of claim 6, wherein the control unit enables the first foam pump or the second foam pump to provide the foam to the second pipe.

8. A direct injection foam delivery system, comprising:
    a water pump for pumping water through a first pipe;
    a foam pump for pumping foam through a second pipe;
    a mixing chamber having a first input coupled for receiving the water and a second input coupled for receiving the foam and an output for producing a water and foam mixture;

a control unit;

a first conductivity sensor for monitoring conductivity of the water and foam mixture and providing a mixture conductivity signal to the control unit;

a second conductivity sensor for monitoring conductivity of the water and providing a water conductivity signal to the control unit, wherein the control unit controls the foam pump in response to a difference between the mixture conductivity signal and water conductivity signal; and a temperature sensor monitors the water and provides a temperature signal to the control unit wherein the control unit controls the foam pump flow to compensate for changes in water conductivity resulting from changes in water temperature.

9. The direct injection foam delivery system of claim 8, comprising a flow meter coupled in-line with the water pump and having an output coupled to the control unit.

10. The direct injection foam delivery system of claim 9, wherein the flow meter including a paddle wheel sensor having a plurality of paddles which rotate to sense water flow.

11. The direct injection foam delivery system of claim 9, wherein the control unit includes a microprocessor coupled for receiving electrical signals and generating a control signal to regulate the foam pump.

12. The direct injection foam delivery system of claim 9, further including an operator control panel coupled to the control unit for inputting a water and foam mixing ratio.

13. The direct injection foam delivery system of claim 8, wherein the first conductivity sensor includes first and second plates positioned in the flow stream of the conduit for measuring conductivity of the water and foam mixture.

14. The direct injection foam delivery system of claim 8, wherein the control unit further includes:

a first interface circuit coupled between the first conductivity sensor and the control unit for generating a voltage having dual polarity and a fifty percent duty cycle; and a second interface circuit coupled between the second conductivity sensor and the control unit for generating a voltage having dual polarity and a fifty percent duty cycle.

15. A system for mixing first and second fluids, comprising:

a conduit including a mixing chamber for transporting the first fluid under pressure, wherein the second fluid is injected into the conduit at the mixing chamber for producing a mixture of first and second fluids;

a regulator for controlling a flow rate of the second fluid;

a first conductivity sensor coupled to the conduit for monitoring conductivity of the first and second fluid and providing a mixture conductivity signal to the regulator;

a second conductivity sensor coupled to the conduit for monitoring conductivity of the first fluid and providing a first fluid conductivity signal to the regulator, wherein the regulator controls the injection of the second fluid in response to a difference between the mixture conductivity signal and first fluid conductivity signal; and a flow meter coupled to the conduit for monitoring a flow rate of the first fluid and providing a flow signal to the regulator which controls the injection of the second fluid at the mixing chamber in response to the flow signal.

16. The system of claim 15, further including:

a first pump for pumping the first fluid through a first pipe;

a second pump for pumping the second fluid through a second pipe; and a mixing chamber having a first input coupled for receiving the first fluid and a second input coupled for receiving the second fluid and an output for producing the mixture of first and second fluids.

17. The system of claim 16, wherein the regulator includes:

a control unit coupled with the flow meter;

the flow meter coupled in-line with the first pump.

18. The system of claim 17, wherein the flow meter including a paddle wheel sensor having a plurality of paddles which rotate to sense first fluid flow.

19. The system of claim 17, wherein the control unit includes a microprocessor coupled for receiving electrical signals and generating a control signal to regulate the second pump.

20. The system of claim 17, further including an operator control panel coupled to the control unit for inputting a first and second fluid mixing ratio.

21. The system of claim 16, further including:

a temperature sensor that monitors the first fluid and provides a temperature signal to the regulator wherein:

the regulator controls the second pump for changes in conductivity of the first fluid resulting from changes in the temperature of the first fluid, and the control unit applies a correction factor to the flow meter to account for changes in viscosity of the first fluid resulting from changes in temperature of the first fluid.

22. The system of claim 15, wherein the first conductivity sensor includes first and second plates positioned in the flow stream of the conduit for measuring conductivity of the mixture of first and second fluids.

23. The system of claim 22, wherein the regulator further includes:

a first interface circuit coupled between the first conductivity sensor and the control unit for generating a voltage having dual polarity and a fifty percent duty cycle; and a second interface circuit coupled between the second conductivity sensor and the control unit for generating a voltage having dual polarity and a fifty percent duty cycle.

24. A method of injecting foam into water flow, comprising:

pumping water through a first pipe;

pumping foam through a second pipe;

mixing the water and foam to produce a water and foam mixture;

monitoring flow rate of the water;

sensing temperature of the water; and regulating the water and foam mixture, wherein the regulation includes:

adjusting foam pumping flow to compensate for changes in water conductivity resulting from changes in water temperature, and adjusting the flow meter to account for changes in water viscosity resulting from changes in water temperature.

25. The method of claim 24, wherein the regulation includes:

monitoring conductivity of the water and foam mixture; and monitoring conductivity of the water; and adjusting a flow rate of the foam pump in response to a difference between the conductivity of the water and conductivity of the water and foam mixture.

* * * * *